United States Patent
Schmitt

(10) Patent No.: US 10,530,240 B2
(45) Date of Patent: Jan. 7, 2020

(54) METHOD FOR PROTECTING AN ELECTRICAL MODULAR UNIT FROM OVERCURRENT DAMAGE

(71) Applicant: SIEMENS AKTIENGESELLSCHAFT, Munich (DE)

(72) Inventor: Daniel Schmitt, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 552 days.

(21) Appl. No.: 15/301,991

(22) PCT Filed: Apr. 8, 2014

(86) PCT No.: PCT/EP2014/057080
§ 371 (c)(1),
(2) Date: Oct. 5, 2016

(87) PCT Pub. No.: WO2015/154796
PCT Pub. Date: Oct. 15, 2015

(65) Prior Publication Data
US 2017/0214312 A1    Jul. 27, 2017

(51) Int. Cl.
*H02M 1/32*    (2007.01)
*H02M 7/00*    (2006.01)
(Continued)

(52) U.S. Cl.
CPC .............. *H02M 1/32* (2013.01); *H01F 27/40* (2013.01); *H01F 38/023* (2013.01); *H02M 7/003* (2013.01); *H02M 7/217* (2013.01)

(58) Field of Classification Search
CPC . H01C 7/008; H01C 7/02; H01C 7/04; H01C 7/06; H01F 27/40; H01F 38/023;
(Continued)

(56) References Cited

U.S. PATENT DOCUMENTS 5,382,938 A *  1/1995  Hansson .............. H01C 1/1406
                                                                  338/114
5,644,283 A *  7/1997  Grosse-Wilde ........ H01C 10/10
                                                                  338/20
(Continued)

FOREIGN PATENT DOCUMENTS

CN         100372202 C    2/2008
DE          4441279 C1    9/1995
(Continued)

*Primary Examiner* — Thienvu V Tran
*Assistant Examiner* — Nicolas Bellido
(74) *Attorney, Agent, or Firm* — Laurence Greenberg; Werner Stemer; Ralph Locher

(57) ABSTRACT

A method protects an electrical modular unit from overcurrent damage by virtue of an inductive component converting electrical energy into magnetic and thermal energy, in which a bypass bypasses the inductive component during regular operation of the modular unit and current flows via the bypass. In order to reduce current spikes in the event of a surge current without significantly enlarging the semiconductor switching the circuit inductance for the commutation circuit, it is proposed that the bypass is opened by an overcurrent flowing through the bypass which is above a current value that can be achieved during fault-free operation of the modular unit, with the result that more current is forced through the inductive component than residual current flows through the bypass.

15 Claims, 4 Drawing Sheets

(51) Int. Cl.
*H02M 7/217* (2006.01)
*H01F 27/40* (2006.01)
*H01F 38/02* (2006.01)

(58) Field of Classification Search
CPC .......... H01H 33/596; H01H 9/30; H01H 9/42;
H01H 9/542; H01H 1/226; H01H 9/54;
H01H 9/547; H02H 3/085; H02H 3/087;
H02H 9/001; H02H 9/026; H02H 3/023;
H02H 5/042; H02H 5/043; H02H 7/008;
H02H 9/00; H02H 9/023; H02H 9/025;
H02H 9/028; H02J 3/01; H02J 3/36;
H02M 1/32; H02M 7/003; H02M 7/217;
Y02E 40/40; H05K 1/025

USPC ........................... 361/13, 93.8, 113; 307/105
See application file for complete search history.

(56) References Cited

U.S. PATENT DOCUMENTS

| | | | |
|---|---|---|---|
| 5,796,568 A | * | 8/1998 | Baiatu ...................... H01C 1/08 338/22 R |
| 5,828,291 A | | 10/1998 | Baumann et al. |
| 5,969,928 A | * | 10/1999 | Hashimoto ............ H02H 9/026 361/106 |
| 5,977,861 A | * | 11/1999 | Duggal .................. H01C 7/028 338/112 |
| 6,094,129 A | * | 7/2000 | Baiatu ...................... H01C 1/08 338/210 |
| 6,300,859 B1 | * | 10/2001 | Myong ................ H01C 1/1406 337/14 |
| 2011/0177953 A1 | | 7/2011 | Llambes et al. |

FOREIGN PATENT DOCUMENTS

| | | | |
|---|---|---|---|
| EP | 0363746 A1 | * 4/1990 | ............... H01C 1/08 |
| KR | 20120140650 A | 7/2011 | |
| WO | 9827635 A1 | 6/1998 | |

* cited by examiner

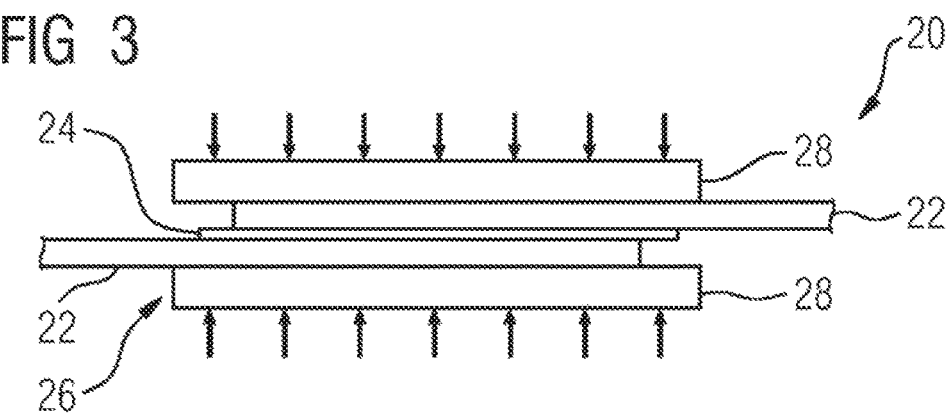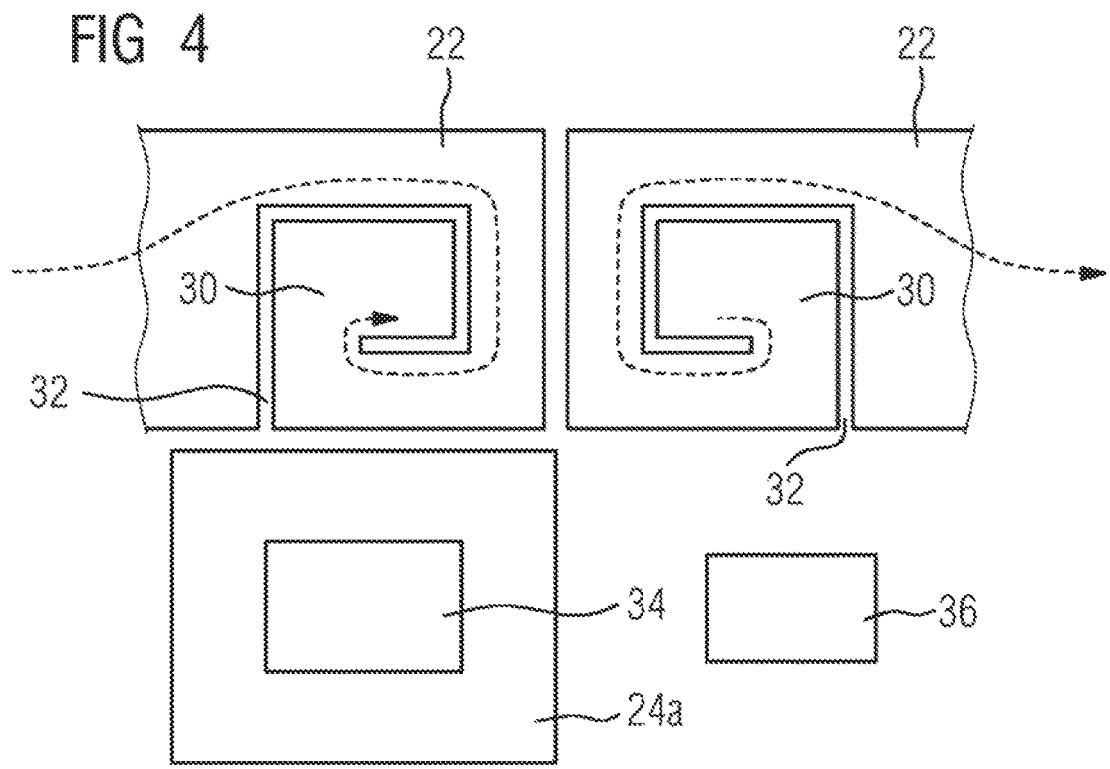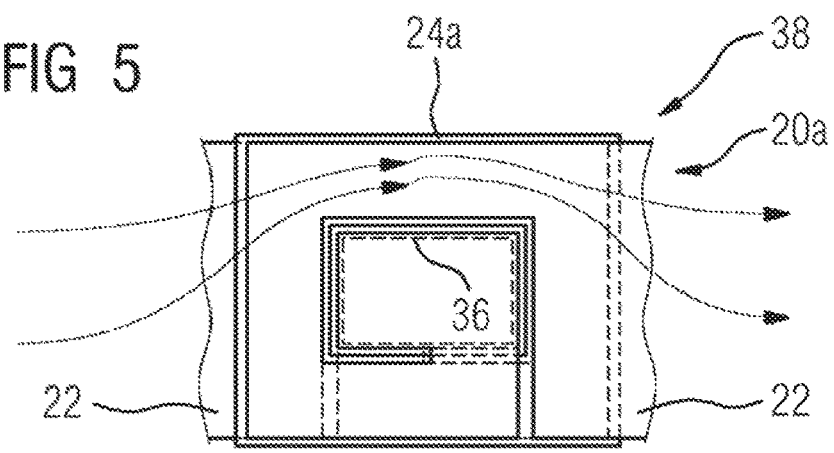

METHOD FOR PROTECTING AN ELECTRICAL MODULAR UNIT FROM OVERCURRENT DAMAGE

BACKGROUND OF THE INVENTION

Field of the Invention

The invention relates to a method for protecting an electric unit against overcurrent damage by virtue of an inductive component converting electric power into magnetic and thermal energy, in which a bypass bypasses the inductive component during regular operation of the unit, and current flows via the bypass.

The increased supply of renewable energies to grid supplies means that high voltage DC transmission (HVDC) is attaining ever greater importance. Particularly in the case of offshore wind farms, a low radiation, inexpensive cable connection that is implementable using HVDC technology is preferred. Since offshore wind farms have no stable grid, self-commutated HVDC, in particular, affords the advantage that it makes regulated reactive power available offshore. Furthermore, self-commutated HVDC can be used to improve dynamic response at the connecting node.

Core elements of the connections from the wind farm grid to the HVDC system and from the HVDC system to large mainland lines are formed by self-commutated HVDC converters with an intermediate voltage circuit and transistors, particularly IGBTs (insulated gate bipolar transistors). The possibility of being able to regulate active and reactive power independently of one another facilitates the connection of self-commutated converters to three-phase grids having a low short-circuit power. The operation of separate networks is also possible, since grid setup, what is known as the black start, is simplified. Self-commutated HVDC converters are equipped with large DC capacitors that are used to support the converted voltage. Transformation from three-phase current to direct current or vice versa is effected by the switching of normally two series-connected IGBTs, between which the alternating current branches off.

In the event of a switching fault in a self-commutated HVDC converter, there may be an abrupt discharge of the energy that the DC capacitor contains via the switches. The energy released in this process leads to destruction of the switches and hence of the converter.

BRIEF SUMMARY OF THE INVENTION

It is an object of the present invention to specify a method for protecting an electric unit against damage by an overcurrent in the kA range that can be used to at least reduce damage as a result of the discharge of an energy store.

This object is achieved by a method of the type cited at the outset in which, according to the invention, the bypass is opened by an overcurrent flowing through it that is above a current value reachable during correct operation of the unit, so that more current is forced through the inductive component than residual current flows through the bypass.

The invention is based on the consideration that an inductive component can buffer a current surge caused by an abrupt discharge of a capacitor, for example, by converting some of the electric power into magnetic and thermal energy, so that this reduces the peak current through the electric unit. Since an inductance is ordinarily introduced into a circuit as a discrete element, it therefore also functions in totally normal switched mode, which means that inductance values are always a compromise between maximum protective effect, that is to say current limiting in the event of damage, and circuit inductance still to be represented for the commutation circuit of the semiconductors.

If the inductive component or an RL combination needs to be of very compact design, for example for use in power electronic circuits with high powers, then this has a very disadvantageous effect on the commutation circuit, since it means that the conductor loop is significantly enlarged. The mechanical mounting of very large and compactly designed RL combinations is also complex.

If, however, as proposed by the invention, the inductive component is bypassed by the bypass during regular operation of the electric unit, then the inductive component has no effect or only little effect in the commutation circuit of the switches, which means that the circuit inductance does not become a problem even when the inductive component is of compact design. By contrast, the opening of the bypass in the event of damage forces the overcurrent through the inductive component and converts some of it into magnetic energy there. The inductive component is therefore used only in the event of an overcurrent.

Particularly when the capacitor is discharged, peak currents can arise within a few milliseconds, which means that it is necessary for the bypass to open very quickly if the electric unit is to be effectively protected. To achieve this, the bypass is opened by the overcurrent itself, that is to say that the flow of the overcurrent through the bypass prompts opening of the bypass and hence the action of the inductive component. It is therefore possible to dispense with a current sensor and a switch connected thereto for opening the bypass.

To reduce the current spike, it is not necessary for all of the overcurrent to flow through the inductive component and to contribute to setup of the protective magnetic field. It is sufficient if at least the largest portion of the overcurrent flows through the inductive component and a residual current flows through the bypass. Complete opening of the bypass in accordance with a mechanical switch is therefore not necessary and the amount of current forced through the inductive component can be set by the conduction behavior of the bypass in the event of an overcurrent.

The inductive component may be a passive electric element having a fixed inductance value. This can be provided by a simple conductor loop, for example in the form of a meander or one or more circular turns, as in the case of a coil. During regular, that is to say correct, operation, it is also possible for a current to flow through the inductive element, but less than in the event of an overcurrent. In this way, it is possible for bypass and inductance to be connected in parallel, the amounts of current that flow through the bypass and the inductive component being able to be set by the conduction behavior of the bypass.

An overcurrent is understood to mean a current value that is above a current value of, by way of example, 5 kA that is reachable during correct operation of the unit. Expediently, the overcurrent is at least twice the maximum value reachable during correct operation. The overcurrent is expediently at least 10 kA, particularly at least 100 kA.

The bypass can form a nonreactive resistance, so that bypass and inductance form an RL circuit having parallel-connected RL elements. The overcurrent opens the bypass expediently directly, for example by means of heating or another physical process. The protection for the electric unit against overcurrent damage does not have to be absolute. It is sufficient if the damage is reduced. The electric unit may be a switch, particularly an IGBT.

In one advantageous embodiment of the invention, an electric conductor of the bypass is embodied such that the overcurrent flowing through the bypass raises the temperature of the conductor to at least 150° C., particularly at least 300° C., expediently within no more than 10 ms, particularly no more than 2 ms. In this case, the overcurrent is expediently ten times the maximum value reachable during correct operation. During correct operation, the temperature of the conductor reaches no more than 100° C. with this geometry.

One way of opening a bypass is for the bypass to be heated by the overcurrent and this to increase the nonreactive resistance of the bypass. As the nonreactive resistance increases, more current is forced through the inductive component. Overheating should not go as far as vaporizing the bypass, however, since this results in the problem of ionization and hence flashover. It is therefore expedient if the bypass remains a compact even in the heated state. A relatively high nonreactive resistance can be maintained, and a flashover can be avoided.

A further possibility for opening the bypass involves a high voltage fuse being opened. This pyrotechnically opens the circuit or removes the conductor bridge and immediately fills the resultant space with sand. This solution has the advantage of high reliability of the circuit, but it is very complex.

The invention is furthermore directed to an electric unit having an overcurrent buffer that comprises an inductive component for converting electric power into magnetic energy and a bypass connected in parallel with the inductive component.

In order to protect the electric unit against overcurrent damage, it is proposed that, according to the invention, the bypass is embodied as a current switched overcurrent switch that opens by virtue of an overcurrent flowing through it that is above a current value reachable during correct operation, so that more current is forced through the inductive component than residual current flows through the bypass.

The electric element to be protected is expediently connected in series with the overcurrent buffer and arranged in a short circuit together with the overcurrent buffer. The electric unit expediently comprises a switch, such as an IGBT, that is connected in series with the overcurrent buffer. The inductive component expediently comprises a conductor loop that is shorted by the bypass. The conductor loop can have one or more meander turns or one or more circular turns in the form of a winding.

Advantageously, the bypass comprises an electrical conductor comprising a PTC thermistor whose temperature coefficient α is greater than that of the conductor of the inductive component, for example copper, particularly at least twice as great, further particularly at least 5× as great, better still at least 10× as great. The relation can relate to a magnitude of the temperature coefficient at 20° C. Since the conductor is regularly warmer than room temperature during operation, however, it is particularly advantageous if the values relate to a temperature of 50° C. Further, it is advantageous if the temperature coefficient α rises with temperature above 20° C. The PTC property means that the nonreactive resistance of the bypass or electrical conductor rises with temperature, so that as temperature rises, an increasing proportion of the overcurrent must flow through the inductive component.

A particularly advantageous material for the electrical conductor is stainless steel. V2A stainless steel is particularly advantageous in terms of electrical conduction behavior at rising temperature.

In a further advantageous refinement of the invention, the inductive component has a first conductor having a conductor loop having a loop start and a loop end, wherein the loop start is connected indirectly via the bypass, and the loop end is connected directly to a second conductor. The conductor loop can produce the inductance. The bypass connects the loop start to a second conductor, as a result of which the inductive component or at least a portion thereof is bypassed. The loop end is connected to the second conductor, so that the current flowing through the loop end produces the induction. A conductor is subsequently understood to mean an electric conductor having an electrical conductivity at least such as aluminum, particularly a copper conductor. The geometry of the conductor is expediently such that its resistance is increased only minimally, for example by no more than a factor of 2, particularly no more than 1.2, in comparison with a zero current state by a maximum current that is reachable during regular operation.

The inductance of the inductive component can be increased if the second conductor also has a conductor loop having a loop start and a loop end. In this situation, the loop starts of the two conductors are expediently connected to one another via the bypass in order to bypass the inductive component. The two loop ends of the two conductors are expediently connected to one another directly, so that the two loops form the inductive component.

Particularly in the case of a high current application, it is advantageous if the electric conductor(s) of the inductive component is/are embodied as busbars. A busbar, particularly in the form of a ribbon, for example made of copper, has a large conductor cross section of particularly at least 100 m², particularly at least 500 mm². If the inductive component is formed in the ribbon, for example by virtue of incisions in the ribbon, then it is possible to dispense with a separate inductive part. In addition, the inductive component can be mechanically anchored in a very robust fashion.

Preferably, a conductor loop is formed in the busbar such that it lies in the plane of the busbar. This is expediently the case with both conductors and both busbars.

A robust design in combination with simple manufacture can be achieved if the inductive component is a conductor loop in the form of a worm or contains multiple conductor loops in the form of worms, preferably one worm in each busbar.

At high currents, the overcurrent buffer or the inductive component is at the mercy of high mechanical forces. High mechanical strength for the overcurrent buffer can be attained by virtue of the overcurrent buffer having two busbars, shaped as flat conductors, that are situated flat above one another. A clamping brace can firmly connect the two busbars to one another.

Irrespective of the form of the inductive component, it is advantageous if the bypass and the inductive component—possibly multiple elements of the component, such as busbars—are pressed together by a clamping brace. Unwanted detachment of these elements from one another by the magnetic field that occurs in the event of a fault can be counteracted. The pressure of the elements against one another is expediently at least 10 N/cm², particularly at least 50 N/cm².

The inductive component may be formed from regions of the busbars. The electrical connection between the two busbars is made expediently both via the bypass and via a conductor element, which may be a separate element or a portion of one of the two busbars. The conductor element is expediently part of the inductive component.

It is likewise conducive to good mechanical strength if the inductive component has two busbars or portions thereof, each having a conductor loop embodied as a worm, the two worms being situated above one another. The two worms can be firmly mechanically connected to one another by means of pressure in a clamping brace. Expediently, the two worms are connected to one another directly inside the worm and, in each case, at the start of the worm via the bypass. This allows a mechanically robust inductance to be produced in a simple manner.

In respect of the embodiment of the bypass, it is beneficial if it is situated as a plate between the two busbars. In this situation, it is expedient if the plate is no more than half as thick as the busbars, particularly no more than a quarter as thick, so that the material of the plate heats quickly in the event of an overcurrent.

It is likewise possible for the bypass to be situated as one or more strips between the two busbars. The advantage of the strip over the plate is that the conductor cross section through which the overcurrent must flow is substantially smaller in the case of a strip than in the case of the plate, which means that the bypass heats more quickly.

In order to counteract unwanted movement of the bypass relative to the two conductors or busbars in the event of an overcurrent, it is proposed that the bypass is embedded in an insulator.

In order to be able to easily keep the bypass in its place even in the case of very severe magnetic forces in the event of an overcurrent, it is advantageous if the bypass is embodied as a U sheet in which each of the two U limbs lies flat against a busbar. The bypass can be held very firmly by means of pressure in a clamping brace by virtue of the U limbs lying flat against the busbars. Furthermore, the overcurrent is forced through the U bend with a conductor cross section that is smaller in relation to a printed circuit board, so that fast heating of the U bend can be achieved.

An insulator is arranged between the two busbars to the same advantage, wherein the bypass engages around the insulator. The insulator can be firmly pressed against the bypass by mechanical means.

As already mentioned, it is advantageous if the overcurrent buffer has two busbars that are electrically connected to one another via the bypass and are mechanically pressed against one another in a clamping brace by means of surface pressure.

The invention can be applied particularly advantageously in a converter module that contains an electric unit according to the invention. The converter module expediently comprises two DC supply lines for connecting the converter module to a DC power transmission line. The DC supply lines expediently have a capacitor arranged between them as an energy store. Connection of the electric unit to the capacitor in series allows current from the capacitor to be buffered, and the electric unit can be protected.

The converter module may be part of a converter arrangement having a number of converter modules, the converter modules being connected in 2×3 series and the external connections of three series circuits each forming a DC voltage side of the converter arrangement.

The description hitherto of advantageous embodiments of the invention contains numerous features that are reproduced in the individual subclaims, in some cases in a manner combined into multiples. These features can expediently also be considered individually and combined into useful further combinations, however. In particular, these features can each be combined individually and in any suitable combination both with the method according to the invention and with the electric unit according to the invention as per the independent claims. Thus, method features are also intended to be regarded as a property of the corresponding apparatus unit worded in substantive terms, and vice versa.

The properties, features and advantages of this invention that are described above and also the manner in which they are achieved will become clearer and more distinctly comprehensible in connection with the description of the exemplary embodiments that follows, which are explained in more detail in connection with the drawings. The exemplary embodiments are used to explain the invention and do not limit the invention to the combination of features that is indicated therein, not even in relation to functional features. Furthermore, features of each exemplary embodiment that are suited to this purpose can also be considered explicitly in isolation, removed from an exemplary embodiment, introduced into another exemplary embodiment in order to add to it and/or combined with any of the claims.

BRIEF DESCRIPTION OF THE SEVERAL VIEWS OF THE DRAWING

In the drawings:

FIG. 3 shows a schematic illustration of an overcurrent buffer from FIG. 2 with two busbars and a bypass, FIG. 4 shows the two ends of the two busbars with an inductive component introduced and a bypass sheet, FIG. 5 shows the three elements from FIG. 4 in assembled form.

DESCRIPTION OF THE INVENTION

Figure 1:
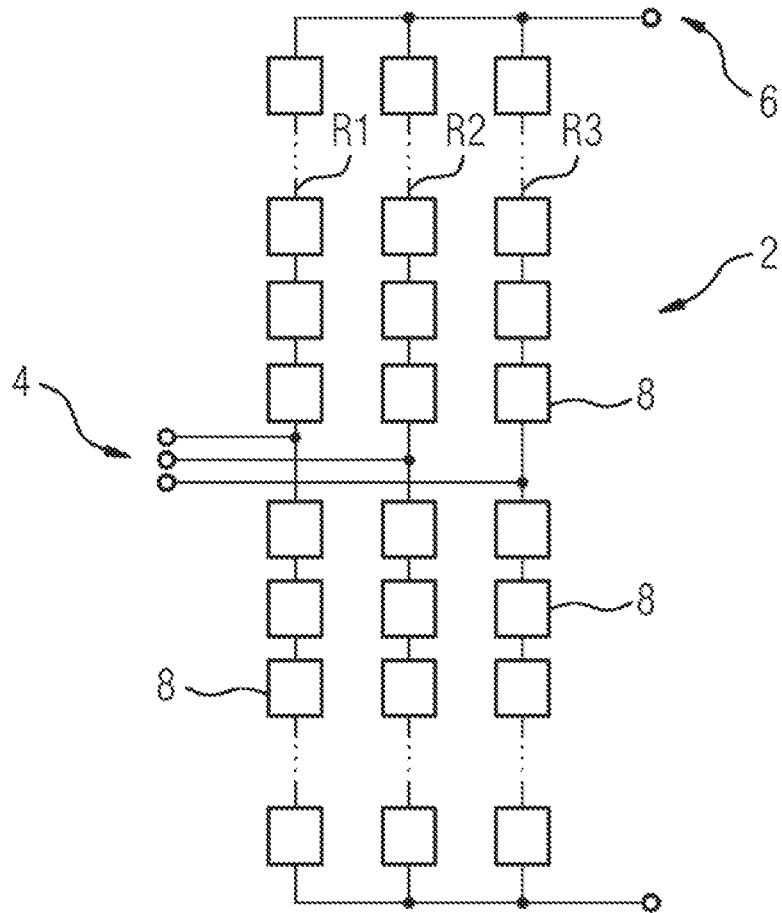
FIG. 1 shows a self-commutated HVDC converter having a multiplicity of HVDC power modules connected in series.

FIG. 1 shows a converter arrangement 2 in the form of a self-commutated HVDC converter for converting three-phase current at a three-phase current input 4 into direct current at a direct current output 6, or vice versa. The converter 2 has a multiplicity of electric units 8, embodied as converter modules, that are connected in series, so that each of the three three-phase current phases from the three-phase current input 4 is connected to the two direct current phases for the direct current output 6 via a respective chain. The arrangement of the converter modules in 2×3 parallel-connected series circuits R1, R2, R3, in which the external connections form the DC voltage side of the converter arrangement 2, allows high voltage having high current levels to be put in order.

Situated between two series circuits R1, R2, R3, which are connected oppositely to one another in terms of voltage, is a respective intermediate connection that forms one of the three AC voltage connections of the three-phase current input 4, and thus, in terms of potential, is situated between the upper converter modules 8 and the lower converter modules of the two series circuits R1, R2, R3 in FIG. 1.

Figure 2:
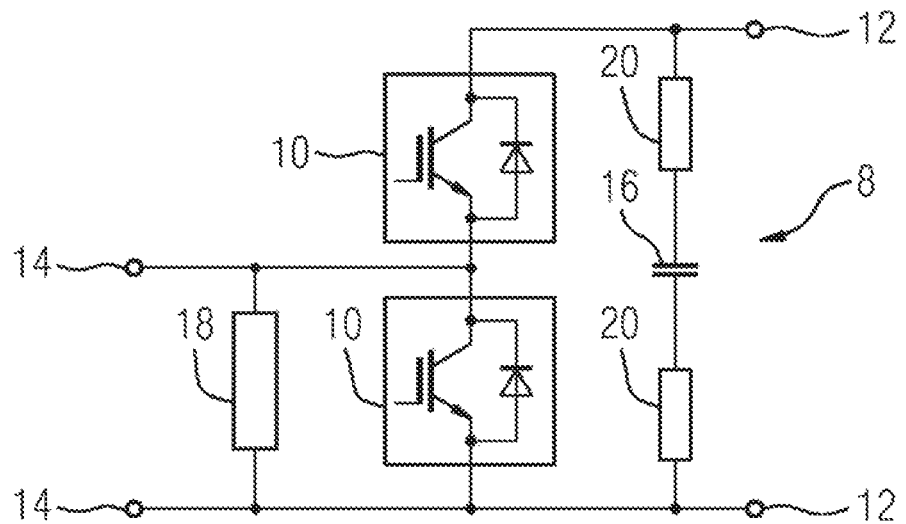
FIG. 2 shows an HVDC power module having two switches, a capacitor, two overcurrent buffers and a bypass.

The electric units 8 of the converter arrangement 2 are embodied identically and presented in more detail in FIG. 2. Each converter module 8 comprises two switches 10, which are each embodied as an IGBT and are designed to switch currents in the kA range and voltages in the kV range. Alternatively, there may also be just one switch 10 or more switches 10. The two switches 10 are situated, in terms of potential, in series between the two poles of the DC voltage output 12, one pole of the AC input 14 being coupled to one pole of the DC voltage output 12, and the other AC input 14 being situated between the two switches 10 in terms of potential.

Connected between the two poles of the DC voltage output 12—input and output being intended to be understood in accordance with the direction of current for the conversion—are a capacitor 16 and two overcurrent buffers 20. Connected between the two poles of the AC voltage output 14 is a bypass 18. The bypass 18 contains a pyrotechnic charge for firing out a plunger to short the two poles of the AC voltage output 14 in the event of a fault in the converter module 8. The bypass 18 is actuated by a monitor, not shown, that identifies a fault situation, such as both switches 10 being activated at the same time, for example, so that the capacitor 16 discharges via the two switches 10 in an internal short. The monitor then actuates the bypass 18, so that the converter module 8 is bypassed and removed from the series circuits R1, R2, R3. Control electronics identify the fault or the failure in the converter module 8 and actuate the remaining converter modules 8 of the series circuits R1, R2, R3 accordingly, so that the current conversion is continued in regular operation. Alternatively, it is conceivable for the bypass 18 to be switched between the two poles of the DC voltage output 12, so that the capacitor 16 preferably discharges via the bypass 18.

The circuit in FIG. 2 is merely an example of a multiplicity of ways in which an operating voltage can break down via an electric component, such as via the capacitor 16 from FIG. 2, for example, and a protective effect can be achieved by means of an overcurrent buffer. In this respect, the invention is not limited to an arrangement as in FIG. 2.

FIG. 3 shows a schematic side view of one of the two overcurrent buffers 20. There are two electric conductors shown, which are embodied as ribbon-shaped busbars 22 having a width of several centimeters. Placed between the two busbars 22 is a separator plate that, in the cold state, is used as a bypass 24 and electrically connects the two busbars 22 to one another. The package comprising the two busbars 22 and the bypass 24 has a clamping brace 26 formed around it, said clamping brace being indicated in FIG. 3 by two electrically insulating plates 28 and the arrows pointing in the direction of an action of force. The clamping brace 26 presses the two busbars 22 flat against the bypass 24 and hence holds them against one another in a mechanically secure fashion.

The illustration in FIG. 3 schematically shows the design of an overcurrent buffer 20 in which two busbars are electrically connected by means of a bypass 24 arranged between them. In practice, an overcurrent buffer can have other geometries and arrangements. Specific geometries and arrangements are presented in the subsequent figures.

The embodiment of the ends of the two busbars 22 is presented in FIG. 4. The two busbars 22 each have a worm-shaped conductor loop 30 positioned in them that has been produced by means of incisions 32 in the relevant busbar 22. When the conductor is traced along the line shown in dashes, each conductor loop 30 forms a circular turn that produces an induction by virtue of a current that flows in a corresponding fashion.

Shown below the conductor loop 30 shown on the left-hand side in FIG. 4 is a separator or bypass 24*a*. In this exemplary embodiment, this consists of a planar stainless steel sheet that has had its center provided with an opening 34 in the form of a window in the sheet. The material of the bypass 24*a* has a temperature coefficient α that is at least three times higher than that for copper, both values relating to room temperature. Specifically, the bypass 24*a* is made from V2A stainless steel.

Shown below the conductor loop 30 that is shown on the right-hand side in FIG. 4 is a conductor element 36 that, like the two busbars 22, is made of copper. The thickness of the conductor element 36 matches the thickness of the plate of the bypass 24*a* and, in both cases, is 1 mm. The conductor element 36 fits into the window-like opening 34 of the bypass 24*a* and at least largely fills it.

The four elements shown in FIG. 4 are shown situated above one another in FIG. 5, as shown in FIG. 3. The two plates 28 of the clamping brace 26 have been dispensed with for the sake of clarity. Situated at the very bottom is the busbar 22 coming from the left, with its conductor loop 30. Situated above that is the steel sheet with the conductor element 36 inserted into the opening 34. Situated on that in turn is the busbar 22 routed to the left, with its conductor loop 30. The two conductor loops and the busbars 22 in this region form an inductive component 38.

The bypass 24*a* electrically connects the two loop starts of the two conductor loops 30 directly to one another. In this case, a loop start is the point at which the conductor cross section of the busbar 22 narrows and merges into the conductor loop 30. The loop end, that is to say the inner end of the worm of the conductor loop 30 in this case, is electrically connected to the loop end of the other busbar 22 via the conductor element 36.

In the cold state, that is to say at room temperature or at a temperature of no more than 100° C., current flows from one busbar 22 to the other through the bypass 24*a*, as indicated via the dashed arrows in FIG. 5. The direction of current is irrelevant in this case.

Although this situation has the possibility, in principle, for the flow of current to run along the arrows shown in FIG. 4, that is to say through the conductor loop 30 of the left-hand busbar 22, upward through the conductor element into the inside of the worm loop of the right-hand busbar and from there further rightward in a turn, such a current path having essentially two turns is a high inductive resistance, which means that the current proceeds through the bypass 24*a* for the most part, as shown in FIG. 5. Coming from the left-hand busbar 22, it will proceed upward through the bypass 24*a*, as indicated by the closely dotted segments of the two arrows in FIG. 5. Subsequently, the flow of current will run further rightward in the top right-hand busbar 22. Apart from the small proportion of current flowing in the form of turns, by far the greatest portion of the current will flow through the overcurrent buffer 20 with low induction.

During regular operation of the electric unit 8 embodied as converter modules, current having different current intensities will flow through the overcurrent buffer 20, and the maximum current occurring during regular operation will select the current path shown in FIG. 5. The cross section of the busbars 22 and the choice of material and the geometry of the bypass 24*a* are designed such that the bypass 24*a* sets only a low nonreactive resistance against the flow of current. However, the material of the bypass 24*a* has a substantially greater specific resistance than the material of the electric conductors or busbars 22, which means that the flow of current through the overcurrent buffer 20 is beset by a certain power loss after all. This results in heating of the bypass 24a, the resultant heat being imbalanced with the heat dissipated by the two busbars 22, however, which means that the temperature arriving even at maximum current is so low that the power loss permits the current path as shown in FIG. 5.

If the current rises above the maximum current possible during regular operation, however, that is to say if the current becomes an overcurrent, then the temperature of the bypass 24a continues to rise. In accordance with the temperature coefficient α of the material of the bypass 24a, the power loss then increases not only to a power of 2 with the current but also to a correspondingly even greater extent as a result of the likewise rising electrical resistance. The temperature coefficient α is more than ten times the temperature coefficient of copper.

The electrical resistance and the temperature coefficient α of the material of the bypass 24a and also the geometry, particularly the conductor cross section of those parts through which the greatest portion of the current through the overcurrent buffer 20 or the bypass 24a flows, is then set such that the temperature of the bypass 24a at maximum possible current remains so low during regular operation that the current path through the bypass 24a is maintained, for example as shown in FIG. 5.

On the other hand, in an overcurrent situation as from a defined current intensity of, by way of example, 50 times the maximum current under regular circumstances, particularly for as much as 10 times, the temperature of the bypass 24a is intended to rise to such an extent that the electrical conductivity falls to such an extent that at least the predominant flow of current no longer passes through the bypass 24a. The greatest portion of the overcurrent is now routed through the inductive component 38 of the overcurrent buffer 20, as shown by the dashed arrows in FIG. 4. The path between the two busbars 22 is covered by the conductor element 36 in this case. The bypass 24a is now open, with a small portion of the overcurrent still being able to flow through the bypass 24a, since the latter still retains a certain conductivity. This behavior means that the bypass 24a is a current switched overcurrent switch, that is to say a switch that switches on the basis of the current flowing through it.

The geometry of the bypass 24a is designed such that with an overcurrent flowing through the overcurrent buffer 20a and a current intensity that is 50 times the maximum current under regular circumstances, particularly at as much as 10 times, the temperature of the bypass 24a rises to at least 300° C. within 1 ms. In addition, the electrical resistance of the bypass 24a rises to at least 10 times its maximum regular value in the same time. This turns the bypass 24a into a current switched overcurrent switch that opens in such an overcurrent situation.

Figure 6:
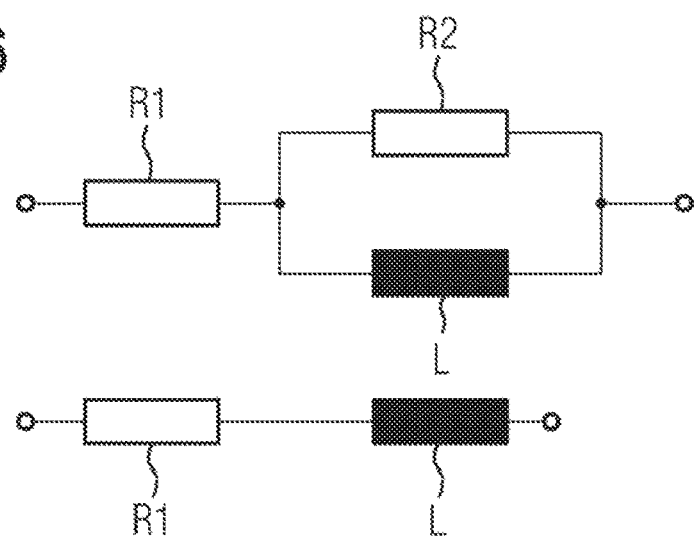
FIG. 6 shows two equivalent circuits for the overcurrent buffer.

An equivalent circuit diagram for the overcurrent buffer is presented in FIG. 6 for normal operation in the upper region and for the case of a fault, that is to say overcurrent operation, in the lower region. The resistance R1 represents the nonreactive resistance of the two busbars 22, and the resistance R2 represents the nonreactive resistance of the bypass 24a. The inductive component L is that of the inductive component 38, that is to say of the two conductor loops 30 of the two busbars 22 with the conductor element 36. During fault-free operation, the current flows as indicated in FIG. 5 and the resistance R2 of the bypass 24a represents an additional nonreactive resistance besides that of the two busbars 22, that is low when the bypass 24a is cold. The resistance R1 of the two busbars 22 is also low. The inductance L of the inductive component 38 is likewise low, since the current flows at least decidedly predominantly without loops through the bypass 24a and not through the inductive component 38 arranged in parallel.

In the event of a fault, the resistance R2 of the bypass 24a rises very sharply, which means that the flow of current through the bypass 24a is now next to irrelevant. The path through the resistance R2 is therefore blocked and is omitted. The resistance R1 of the two busbars 22 is somewhat higher, since the current path is extended and the conductor cross section in the conductor loops 30 is smaller than through the remaining region of the busbars 22. However, there is a substantial increase in the inductance L as a result of the loop-shaped profile of the flow of current, as indicated in FIG. 4. The inductive component 38 develops its inductive resistance, by virtue of which a portion of the electric power is converted into magnetic energy around the inductive component 38 or through the latter. This lowers the current intensity of a current spike, and the damage to the switches 10 and the electric unit 8 as a whole is reduced. The magnetic energy is converted back into electric power only when the current falls, that is to say downstream of the current spike, and therefore widens the current pulse. Since the duration of the current pulse is substantially less critical than the maximum current intensity of the overcurrent, however, this return of the magnetic energy to electric power is smaller, since a substantial portion of the previously stored energy in the capacitor has already been converted into thermal losses (resistive losses). The remaining magnetic energy is converted back into electric power so as then to be converted into magnetic energy once again. This damped periodic oscillation lasts until essentially all of the energy has been converted into thermal losses.

Figure 7:
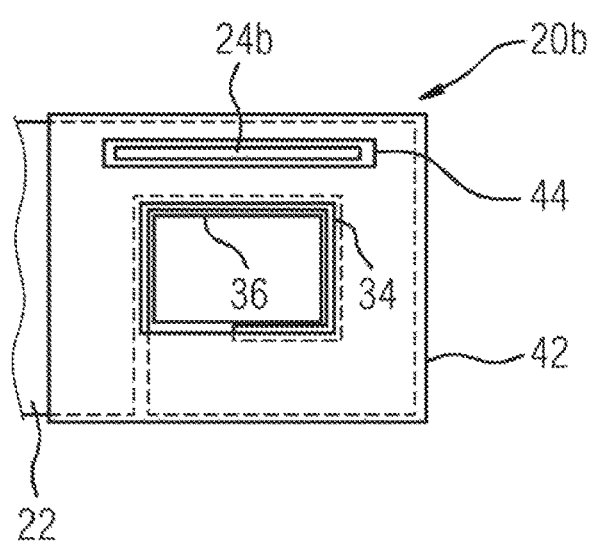
FIG. 7 shows a bypass in an alternative form as a strip in an insulator.

FIG. 7 shows an overcurrent buffer 20b with a different arrangement for a bypass 24b, which is embedded in an insulator 42. The description below is limited essentially to the differences over the preceding exemplary embodiment, to which reference is made in respect of features and functions that remain the same. Parts that essentially remain the same are denoted by the same reference symbols in principle, and features that are not mentioned are adopted in the respective subsequent exemplary embodiments from the preceding ones, without being described again.

FIG. 7—analogously to FIG. 5—shows the left-hand and lower busbar 22 and the conductor element 36 situated in the center of its worm-shaped conductor loop 30. Instead of the stainless steel plate from FIG. 4 and FIG. 5, the end of the busbar 22 has an insulator 42 fitted to it in the form of an electrically insulating plate that in turn contains the opening 34 in the manner of the bypass 24a. This opening 34 contains the conductor element 36, which, analogously to the bypass 24a, is of approximately the same thickness—taking into consideration the complete compression of the clamping brace—as the insulator 42.

The bypass 24b has been reduced to a metal strip that is inserted in a recess 44 in the insulator 42. The thickness of the bypass 24b or of the metal strip is identical to the thickness of the insulator 42. Set atop this structure is now the right-hand busbar 22 from FIG. 5, which is not shown in FIG. 7 for the sake of clarity, however.

The current path through the bypass 24b is essentially identical to that from FIG. 5, but with the conductor cross section of the bypass 24b substantially reduced in comparison with the bypass 24a. This has the advantage that the material of the bypass 24b heats substantially more quickly in the event of an overcurrent, so that the bypass 24b opens more quickly and the overcurrent is forced through the two conductor loops 30, that is to say the induction 38, more quickly. Accordingly, the resistance R1 from FIG. 6 is somewhat higher during regular operation than in the case of the bypass 24a from FIG. 4 or FIG. 5. An increased loss of electric power may need to be cooled by appropriate cooling elements.

Figure 8:
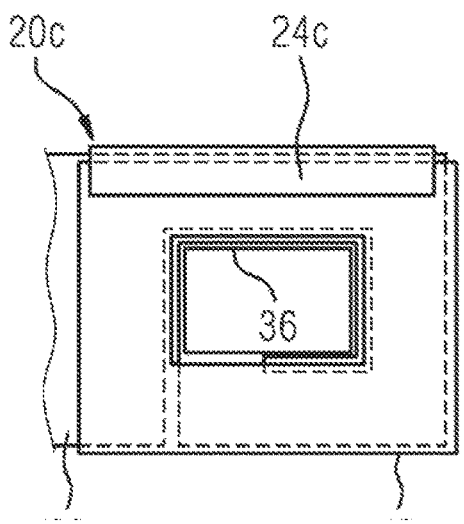
FIG. 8 shows a further bypass in the form of a U sheet.
Figure 9:
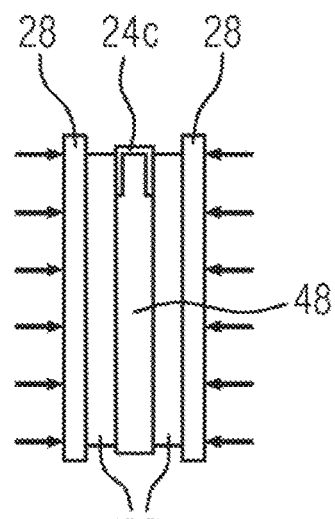
FIG. 9 shows a side view of the bypass from FIG. 8 between two busbars.

A further overcurrent buffer 20c having a bypass 24c of a different geometry is shown from the top in FIG. 8 and from the side in FIG. 9. The bypass 24c is embodied as a U sheet made of stainless steel, the U shape of which is routed around the edge of an insulator 48 on both sides. The two U limbs of the bypass 24c are each clamped between the insulator 48 and a busbar 22. The two plates 28 of the clamping brace 26 are arranged on the outside, these not having been shown in FIG. 8 for the sake of clarity.

This geometry affords the advantage that the bypass 24c has the two U limbs firmly clamped in the clamping brace 26, so that it is not pushed out of its position even under a strong inductive magnetic field. Furthermore, the conductor cross section that is formed by the U bend of the bypass is relatively small, so that even with this geometry, a quickly switching bypass 46 is achieved for an overcurrent situation. Furthermore, power loss can be cooled from the outside relatively easily.

Figure 10:
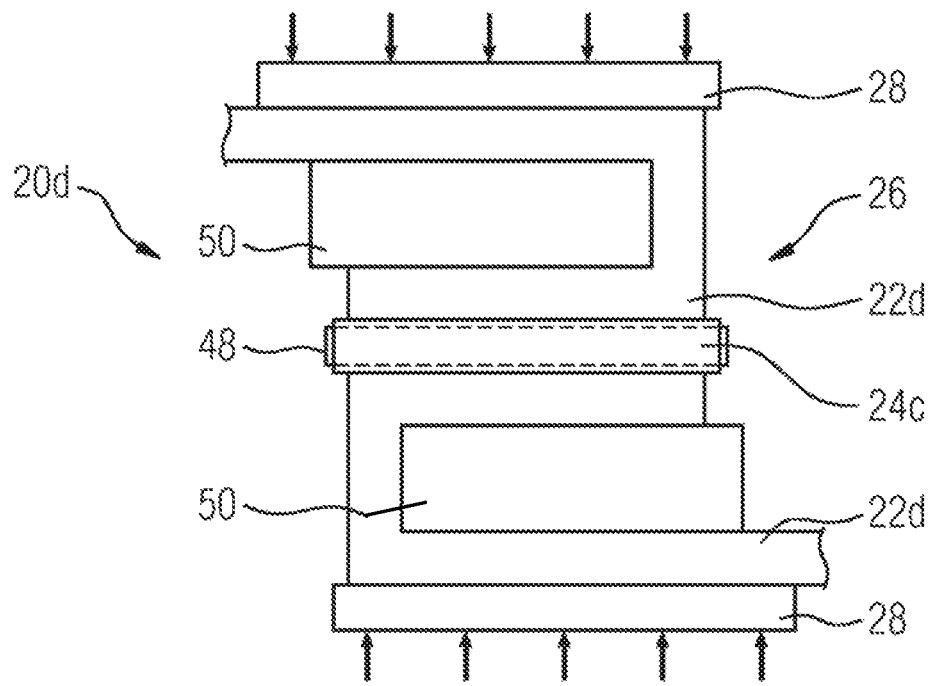
FIG. 10 shows an S-shaped arrangement of busbars to form an overcurrent buffer.

FIG. 10 shows an overcurrent buffer 20d analogously to FIG. 3, but with the bypass 24c from FIG. 8 and FIG. 9 being used. The two busbars 22d are routed around two insulators 50 in a U bend, however, said insulators preventing—when the insulators 50 are mechanically anchored in an appropriate manner—the upper busbar 22d from being displaced to the left or the lower busbar 22d from being displaced to the right. This, in addition to the clamping brace 26 with its two plates 28, allows very robust mechanical mounting of the overcurrent buffer 20d to be achieved.

LIST OF REFERENCE SYMBOLS

2 Converter arrangement
4 Three-phase current input
6 DC output
8 Electric unit
10 Switch
12 DC voltage output
14 AC input
16 Capacitor
18 Bypass
20a-d Overcurrent buffers
22 Busbar
24a-c Bypass
26 Clamping brace
28 Plate
30 Conductor loop
32 Incision
34 Opening
36 Conductor element
38 Inductance
42 Insulator
44 Recess
48 Insulator
50 Insulator

The invention claimed is:

1. A method for protecting an electric unit against overcurrent damage, which comprises the steps of:
providing an inductive component for converting electric power into magnetic and thermal energy, the inductive component having a busbar, embodied as a ribbon, in which the inductive component is formed by virtue of incisions in said ribbon;
bypassing the inductive component via a bypass during regular operation of the electrical unit where current flows via the bypass; and
opening the bypass when an overcurrent flows through the bypass, the overcurrent being above a current value reachable during the regular operation of the electric unit, so that more current is forced through the inductive component than residual current flowing through the bypass.

2. The method according to claim 1, wherein the bypass is heated by the overcurrent and, even in a heated state, conducts some of the overcurrent in a same way as during the regular operation.

3. An electric unit, comprising:
an overcurrent buffer having an inductive component for converting electric power into magnetic energy and a bypass connected in parallel with said inductive component, said bypass embodied as a current switched overcurrent switch that opens by virtue of an overcurrent flowing through said bypass that is above a current value reachable during correct operation, so that more current is forced through said inductive component than residual current flowing through said bypass; and
said inductive component having a busbar, embodied as a ribbon, in which said inductive component is formed by virtue of incisions in said ribbon.

4. The electric unit according to claim 3, wherein:
said busbar is a conductor; and
said bypass has an electrical conductor containing a positive temperature coefficient thermistor with a temperature coefficient $\alpha$ being at least twice as great as that of said conductor of said inductive component.

5. The electric unit according to claim 3, wherein said busbar of said inductive component contains a first conductor having a conductor loop with a loop start and a loop end, said loop start is connected indirectly via said bypass to a second conductor and said loop end is connected directly to said second conductor.

6. The electric unit according to claim 5, wherein said second conductor contains a conductor loop having a loop start and a loop end, and said loop starts of said first and second conductors are connected via said bypass to one another, and said loop ends of said first and second conductors are connected directly to one another.

7. The electric unit according to claim 3, wherein said busbar is one of two busbars, shaped as flat conductors, that are situated flat above one another, form said inductive component and are connected to one another both via said bypass.

8. The electric unit according to claim 3, wherein said busbar of said inductive component is one of two busbars, each of said busbars having a conductor loop embodied as a worm, said two worms being situated above one another and being connected to one another inside said worm directly and, in each case at a start of said worm, via said bypass.

9. The electric unit according to claim 7, wherein said bypass is a plate disposed between said two busbars.

10. The electric unit according to claim 7, wherein said bypass is a strip disposed between said two busbars.

11. The electric unit according to claim 7, wherein said bypass is embodied as a U-shaped sheet having two U limbs lying flat against said busbars.

12. The electric unit according to claim 7, wherein said overcurrent buffer has an insulator disposed between said two busbars and said bypass engages around said insulator.

13. The electric unit according to claim 3, wherein:
   said busbar is one of two busbars; and
   said overcurrent buffer has a clamping brace and said two busbars are electrically connected to one another via said bypass and are mechanically pressed against one another in said clamping brace by means of surface pressure.

14. The electric unit according to claim 4, wherein the temperature coefficient α is at least ten times greater than that of said conductor of said inductive component.

15. A converter module, comprising:
   an electric unit containing an overcurrent buffer having an inductive component for converting electric power into magnetic energy and a bypass connected in parallel with said inductive component, said bypass embodied as a current switched overcurrent switch that opens by virtue of an overcurrent flowing through said bypass that is above a current value reachable during correct operation, so that more current is forced through said inductive component than residual current flowing through said bypass, said inductive component having a busbar, embodied as a ribbon, in which said inductive component is formed by virtue of incisions in said ribbon;
   two DC supply lines connected to said electric unit; and
   a capacitor disposed between said DC supply lines.

* * * * *